(12) United States Patent
Tsuchiguchi et al.

(10) Patent No.: US 11,598,430 B2
(45) Date of Patent: Mar. 7, 2023

(54) VALVE DEVICE, FLOW RATE CONTROL METHOD, FLUID CONTROL DEVICE, SEMICONDUCTOR MANUFACTURING METHOD, AND SEMICONDUCTOR MANUFACTURING APPARATUS USING THE VALVE DEVICE

(71) Applicant: FUJIKIN INCORPORATED, Osaka (JP)

(72) Inventors: Daihi Tsuchiguchi, Osaka (JP); Toshihide Yoshida, Osaka (JP); Ryutaro Tanno, Osaka (JP); Yuya Suzuki, Osaka (JP); Kenta Kondo, Osaka (JP); Tomohiro Nakata, Osaka (JP); Tsutomu Shinohara, Osaka (JP); Masahiko Takimoto, Osaka (JP)

(73) Assignee: FUJIKIN INCORPORATED, Osaka (JP)

(*) Notice: Subject to any disclaimer, the term of this patent is extended or adjusted under 35 U.S.C. 154(b) by 71 days.

(21) Appl. No.: 17/425,974

(22) PCT Filed: Jan. 17, 2020

(86) PCT No.: PCT/JP2020/001534
§ 371 (c)(1),
(2) Date: Jul. 27, 2021

(87) PCT Pub. No.: WO2020/158459
PCT Pub. Date: Aug. 6, 2020

(65) Prior Publication Data
US 2022/0196163 A1    Jun. 23, 2022

(30) Foreign Application Priority Data
Jan. 31, 2019 (JP) .............................. JP2019-015592

(51) Int. Cl.
*F16K 7/16* (2006.01)
*F16K 31/00* (2006.01)
(Continued)

(52) U.S. Cl.
CPC .............. *F16K 7/16* (2013.01); *F16K 31/007* (2013.01); *F16K 31/122* (2013.01); *F16K 37/00* (2013.01);
(Continued)

(58) Field of Classification Search
CPC . F16K 7/16; F16K 7/17; F16K 31/007; F16K 31/122; F16K 31/1225;
(Continued)

(56) References Cited

U.S. PATENT DOCUMENTS 4,471,256 A * 9/1984 Igashira .............. H01L 41/0474
239/584
5,281,885 A * 1/1994 Watanabe ............. H01L 41/083
251/129.01
(Continued)

FOREIGN PATENT DOCUMENTS

CN 108692062 10/2018
CN 106687728 8/2019
(Continued)

OTHER PUBLICATIONS

Official communication received in International Patent Application No. PCT/JP2020/001534, dated Mar. 31, 2020.
(Continued)

*Primary Examiner* — Minh Q Le
(74) *Attorney, Agent, or Firm* — Greenblum & Bernstein, P.L.C.

(57) ABSTRACT

A valve device capable of precisely adjusting a flow rate includes: an operating member for operating a diaphragm and provided movably between a closed position at which
(Continued)

diaphragm closes a flow path and an open position at which diaphragm opens the flow path; a main actuator that receives pressure from a supplied drive fluid and moves the operating member to the open position or the closed position; an adjusting actuator for adjusting the position of the operating member positioned in the open position by using a passive element which expands and contracts in response to a given input signal; a position detecting mechanism for detecting the position of the operating member with respect to a valve body; and an origin position determining unit that uses a valve closed state in which the diaphragm contacts to valve seat to determine an origin position of the position detecting mechanism.

7 Claims, 15 Drawing Sheets

(51) Int. Cl.
*F16K 31/122* (2006.01)
*F16K 37/00* (2006.01)
*F16K 31/02* (2006.01)
*F16K 7/17* (2006.01)
*G05D 7/06* (2006.01)

(52) U.S. Cl.
CPC .............. *F16K 7/17* (2013.01); *F16K 31/02* (2013.01); *F16K 31/1225* (2013.01); *F16K 37/0033* (2013.01); *G05D 7/0635* (2013.01)

(58) Field of Classification Search
CPC ...... F16K 31/02; F16K 37/00; F16K 37/0033; G05D 7/0635
USPC .......... 251/14, 331, 129.06; 137/487.5, 510; 156/345.15, 345.24, 345.26
See application file for complete search history.

(56) References Cited

U.S. PATENT DOCUMENTS

| | | | | |
|---|---|---|---|---|
| 5,520,001 A | * | 5/1996 | Miyamoto | ................ F16K 7/14 62/50.7 |
| 2001/0038083 A1 | * | 11/2001 | Sakurai | ................. F16K 31/007 251/129.06 |
| 2010/0090151 A1 | | 4/2010 | Tanikawa et al. | |
| 2014/0374634 A1 | * | 12/2014 | Ohtsuki | ................. F16K 7/123 700/282 |
| 2017/0234438 A1 | * | 8/2017 | Tanikawa | ................ F16K 1/523 251/294 |
| 2017/0254430 A1 | | 9/2017 | Hirata et al. | |
| 2017/0292622 A1 | * | 10/2017 | Hayashi | ............... G05D 7/0635 |
| 2018/0087678 A1 | * | 3/2018 | Tokuda | ..................... F16K 7/16 |
| 2018/0283563 A1 | | 10/2018 | Goto et al. | |
| 2019/0285176 A1 | | 9/2019 | Yoshida et al. | |
| 2020/0224776 A1 | * | 7/2020 | Yoshida | ............. F16K 31/1225 |
| 2020/0278033 A1 | * | 9/2020 | Kondo | ................ F16K 37/0041 |
| 2020/0278234 A1 | * | 9/2020 | Kondo | .................. G01F 15/066 |
| 2020/0348158 A1 | * | 11/2020 | Sugita | ..................... G01F 1/363 |
| 2020/0354835 A1 | * | 11/2020 | Watanabe | .......... C23C 16/45544 |
| 2020/0370671 A1 | * | 11/2020 | Takimoto | .............. F16K 31/122 |
| 2020/0393051 A1 | * | 12/2020 | Kondo | ..................... F16K 7/17 |
| 2021/0285552 A1 | * | 9/2021 | Kondo | ..................... F16K 7/16 |
| 2021/0332900 A1 | * | 10/2021 | Sato | .......................... F16K 7/17 |
| 2021/0372532 A1 | * | 12/2021 | Tanno | ..................... F16K 27/02 |
| 2022/0082176 A1 | * | 3/2022 | Tanno | ...................... F16K 7/16 |

FOREIGN PATENT DOCUMENTS

| | | |
|---|---|---|
| JP | 2007-64333 | 3/2007 |
| JP | 2012-102839 | 5/2012 |
| JP | 2016-089931 | 5/2016 |
| JP | 2018-85365 | 5/2018 |
| JP | 2018-085365 | 5/2018 |
| TW | 201241588 | 10/2012 |
| WO | 2018/088326 | 5/2018 |

OTHER PUBLICATIONS

Official Communication Received in Korean Patent Application No. 10-2021-7027215, dated Nov. 1, 2022.
Official Communication Received in Chinese Patent Application No. 202080012063.2, dated Nov. 2, 2022.

* cited by examiner

[fig.1A]
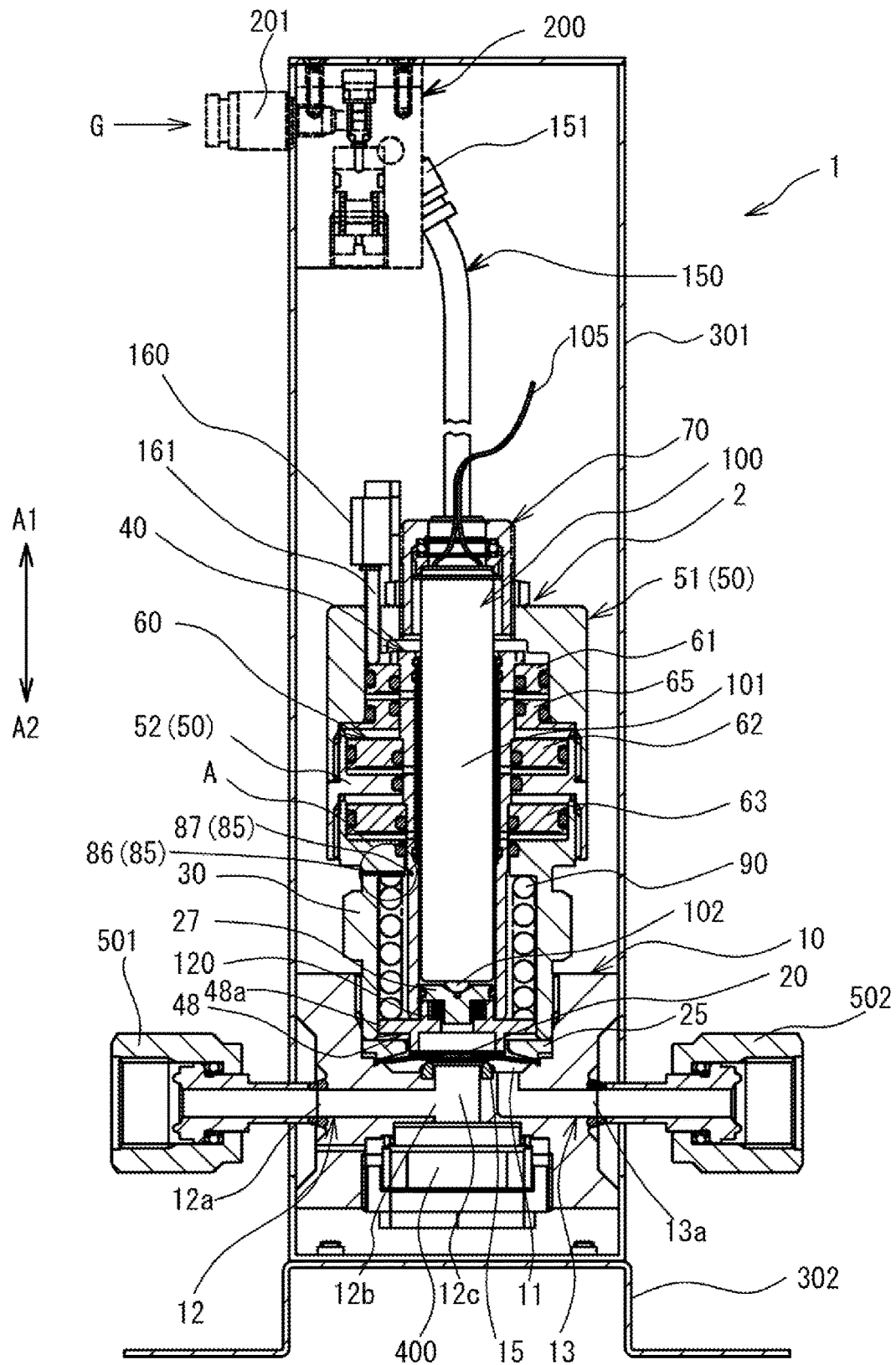

[fig.1B]
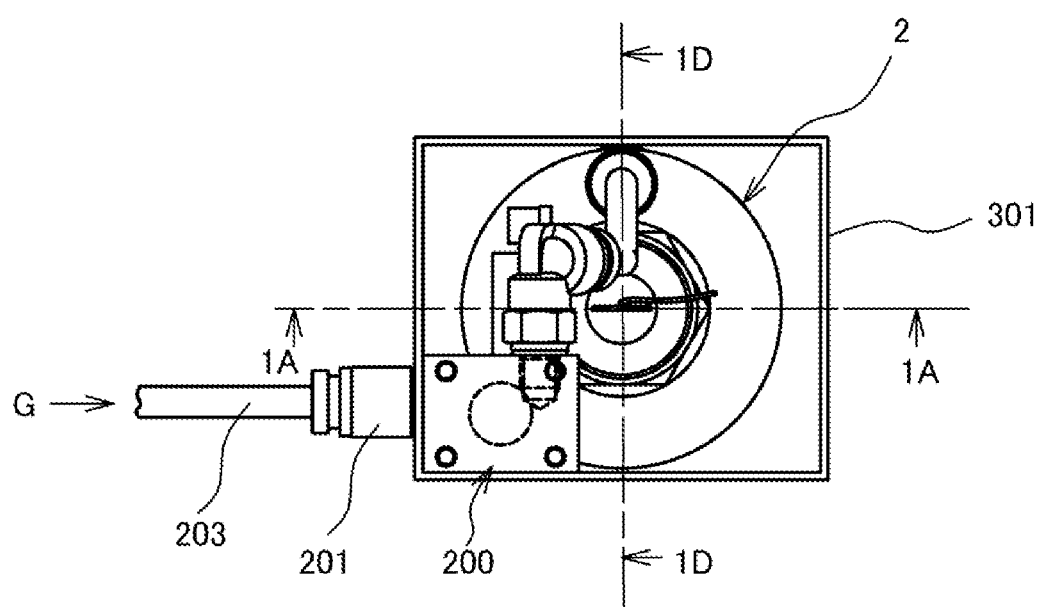

[fig.1C]
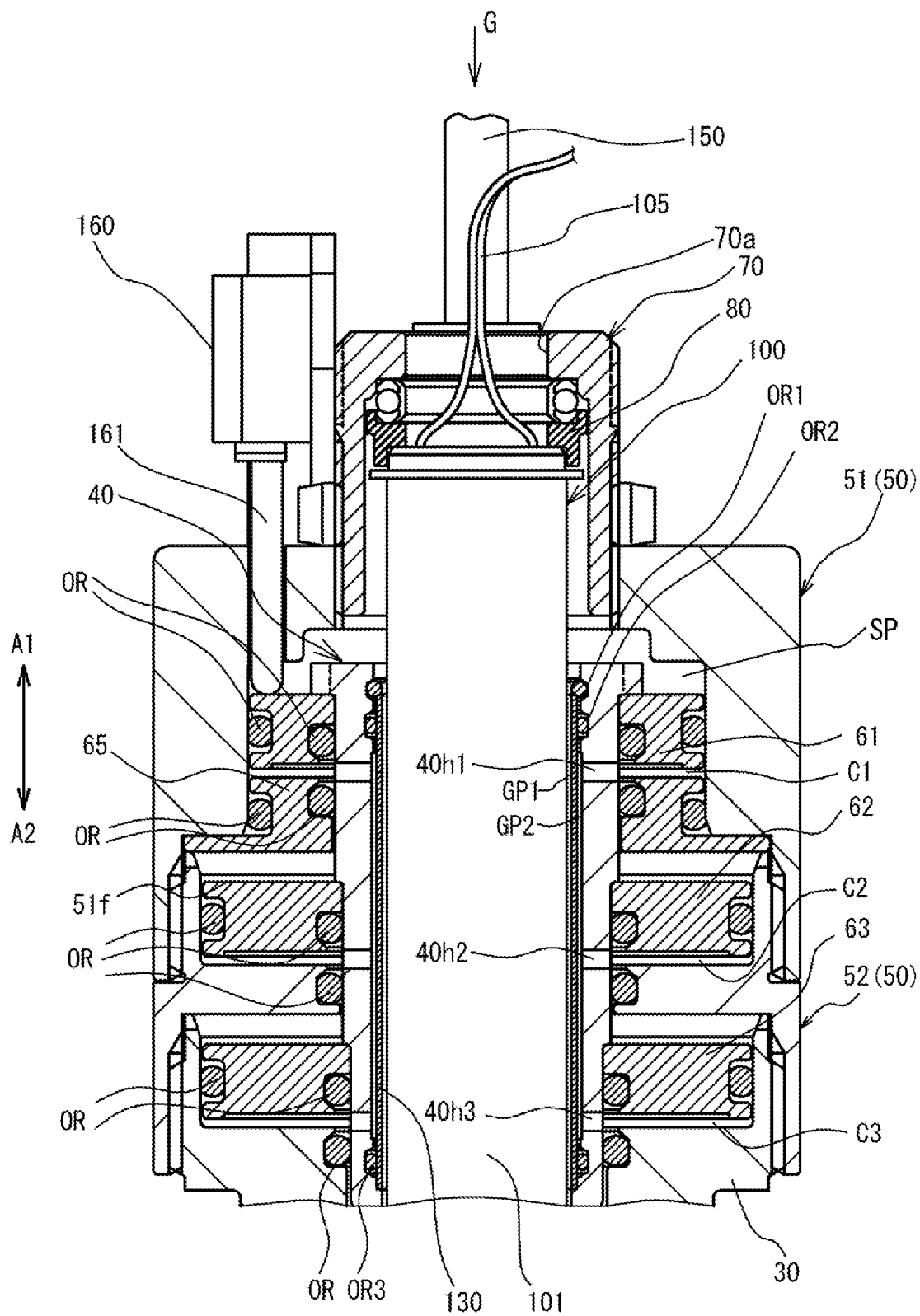

[fig.1D]
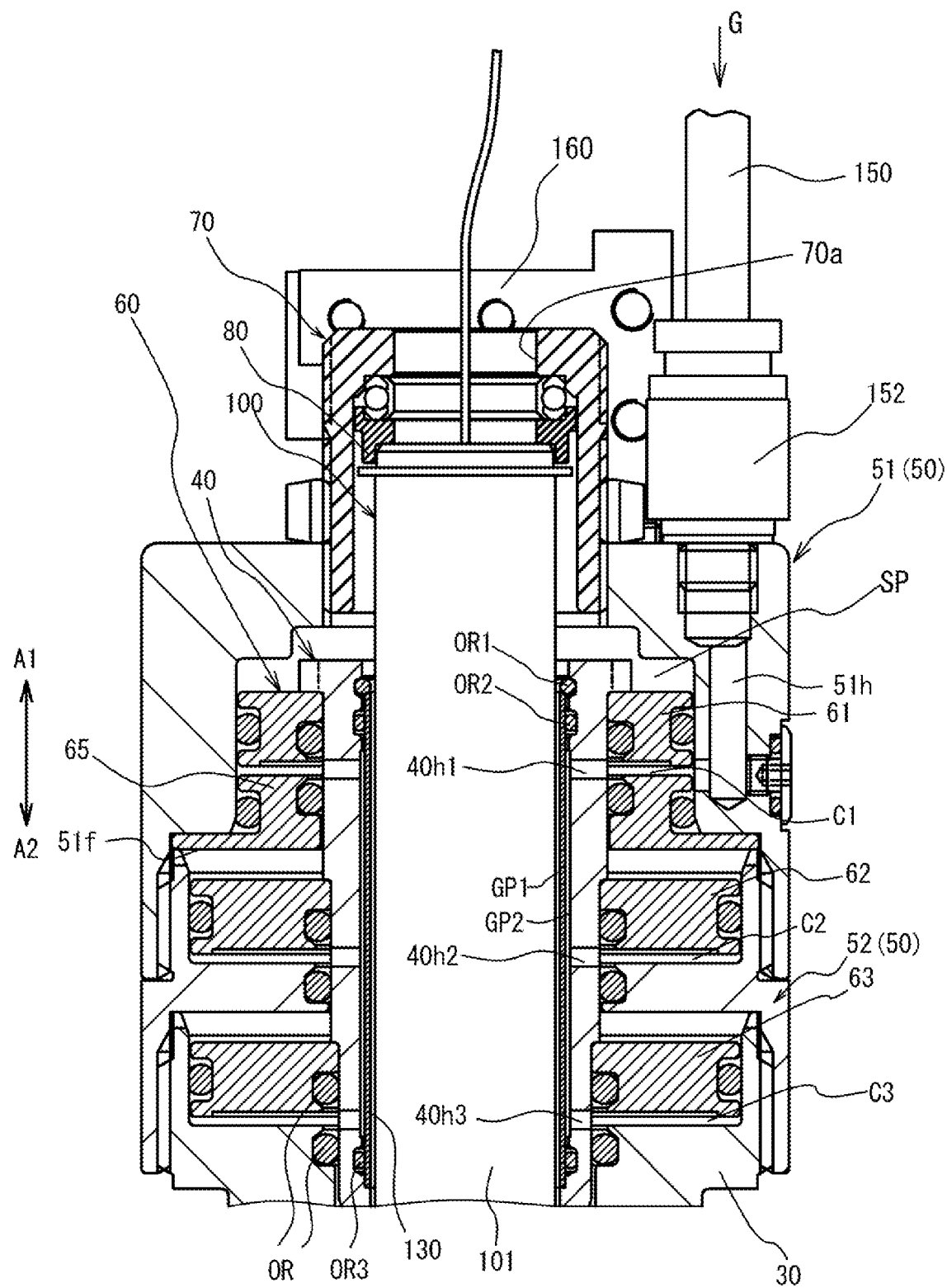

[fig.1E]
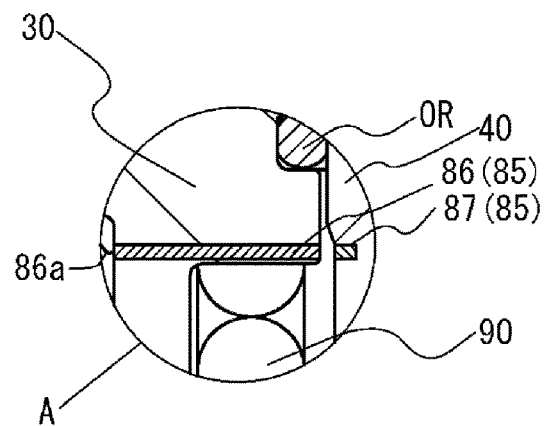
[fig.2]
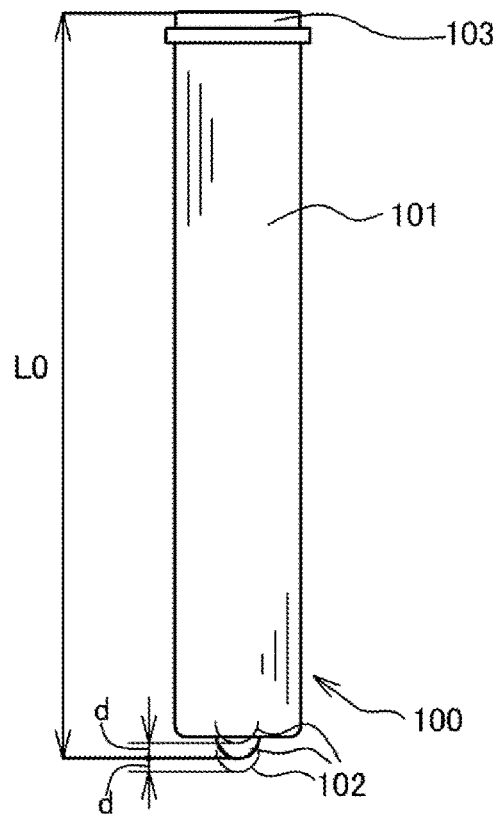

[fig.3]
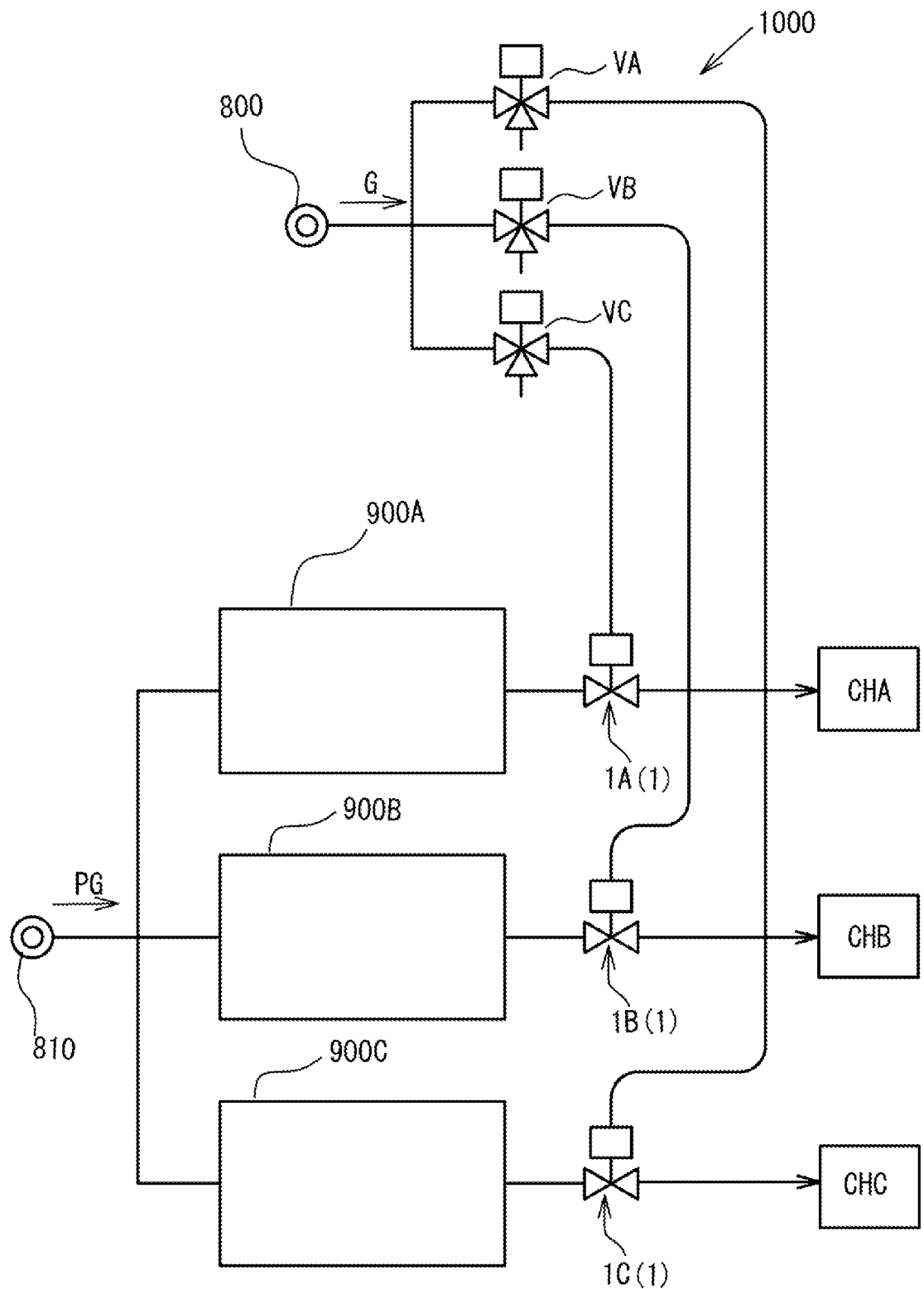

[fig.4]
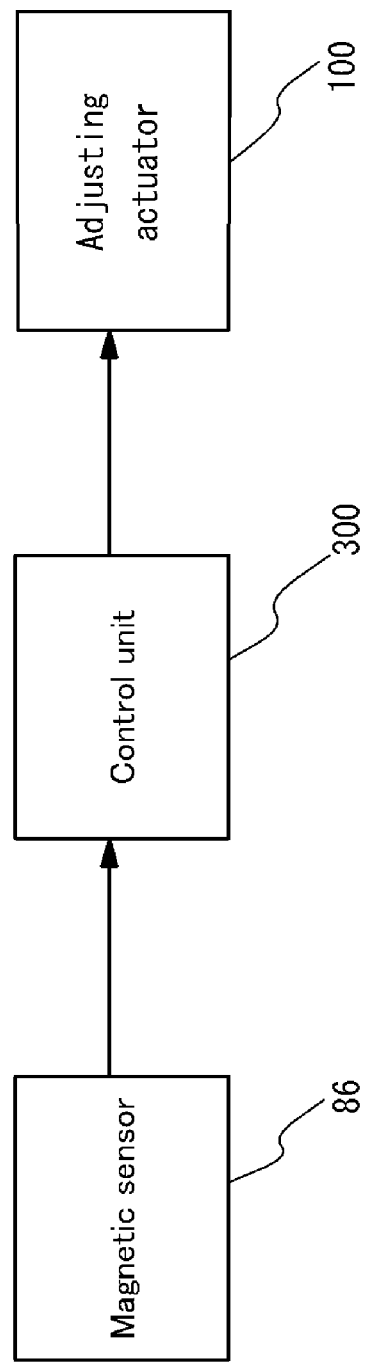

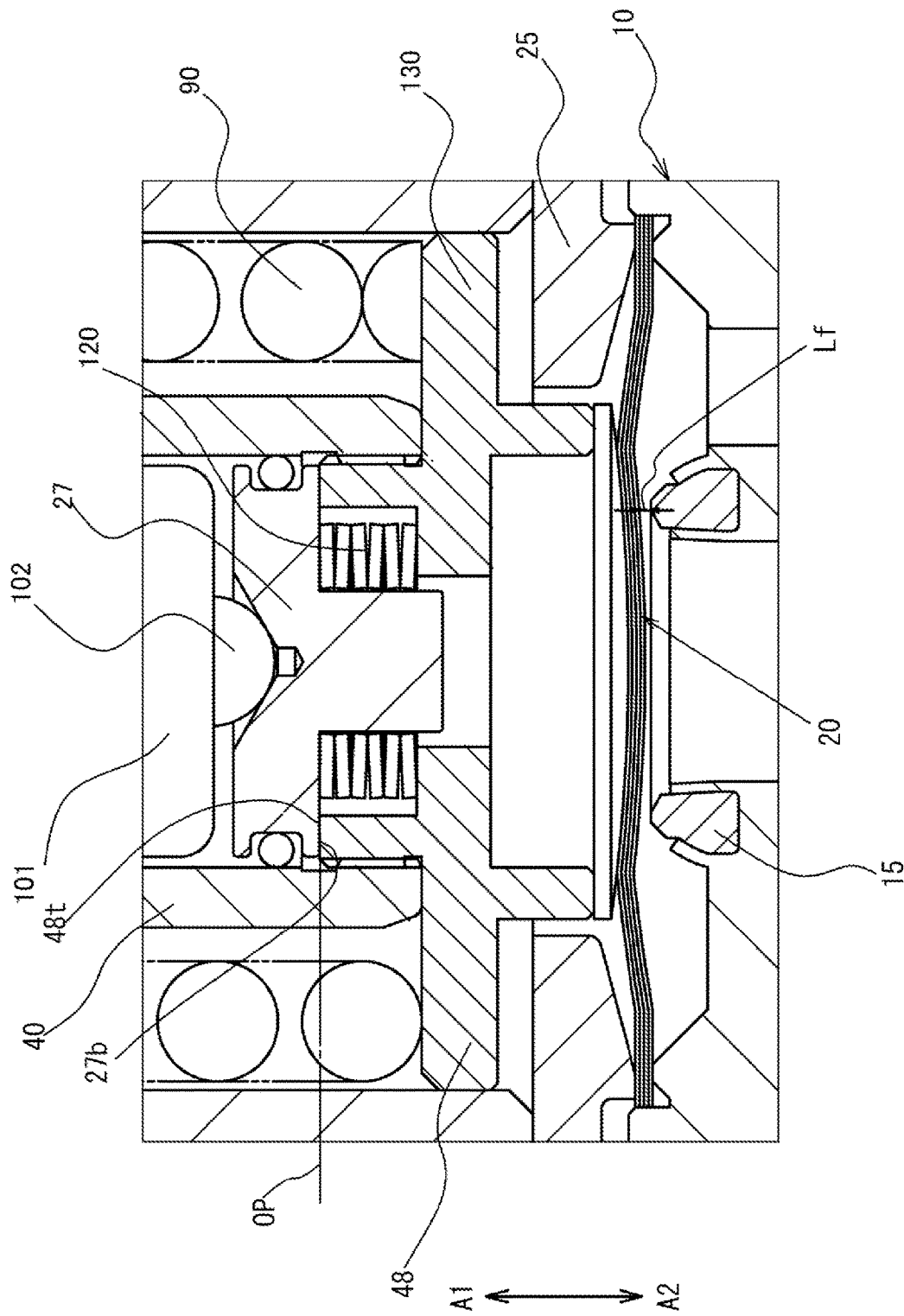

[fig.6]
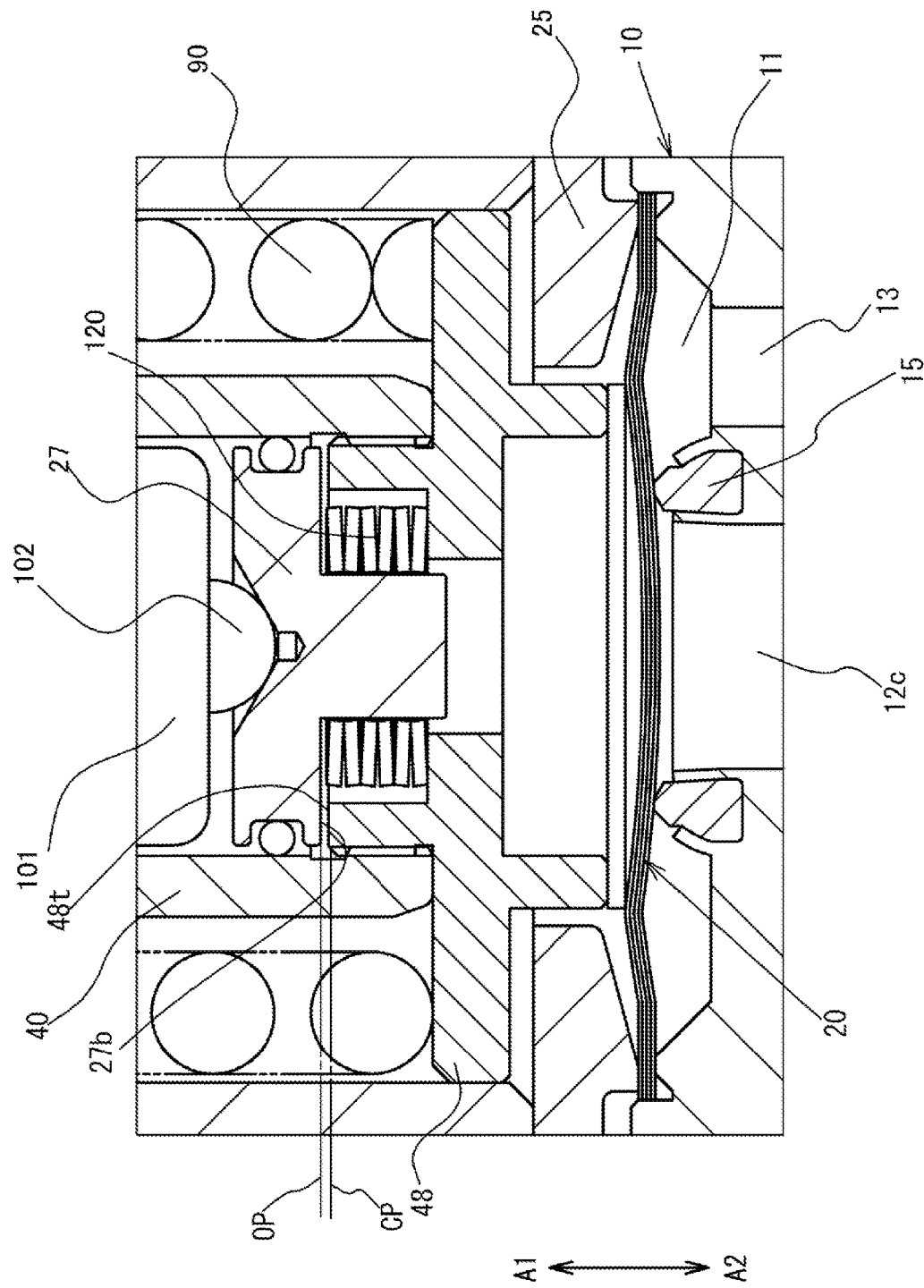

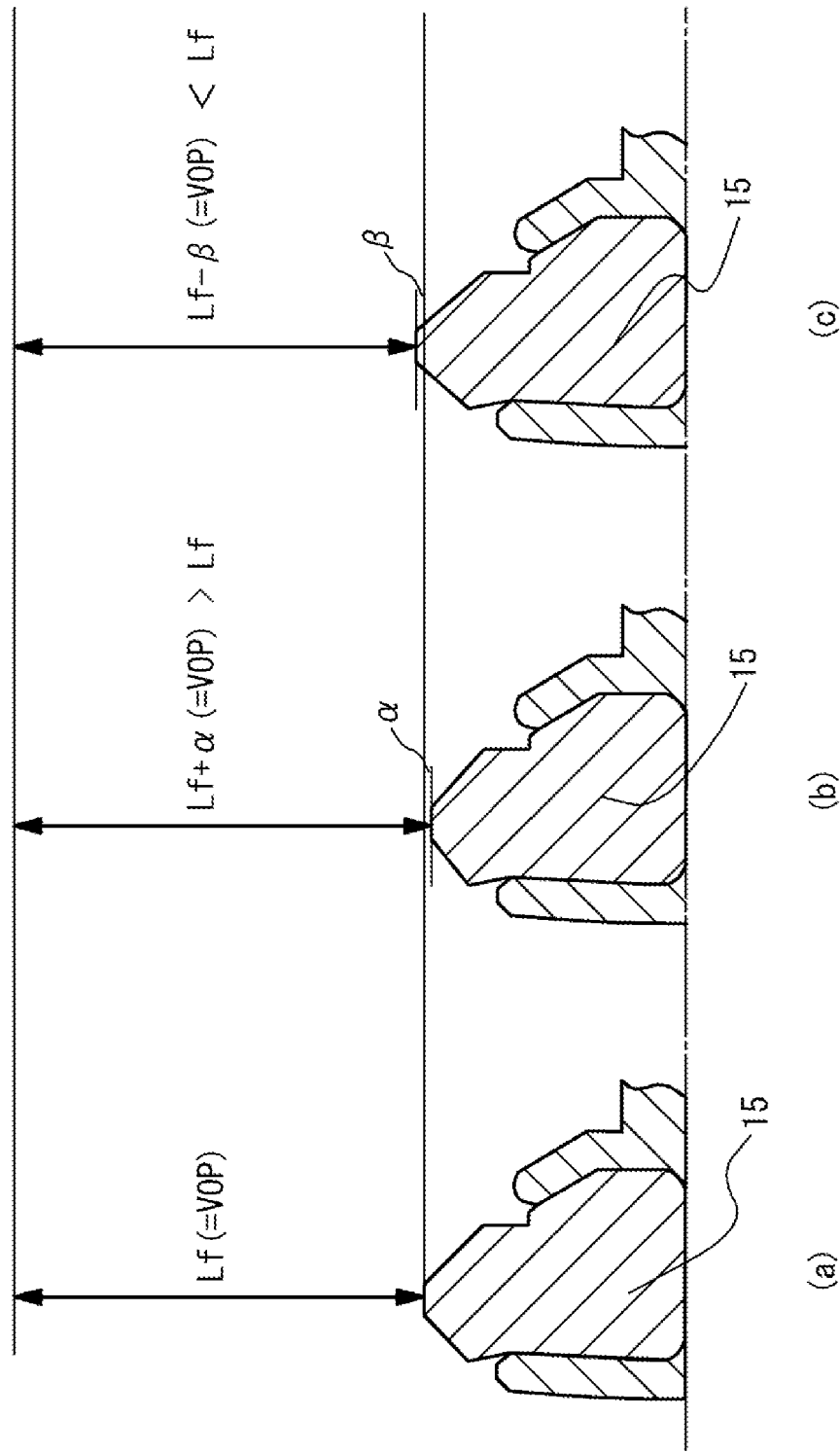

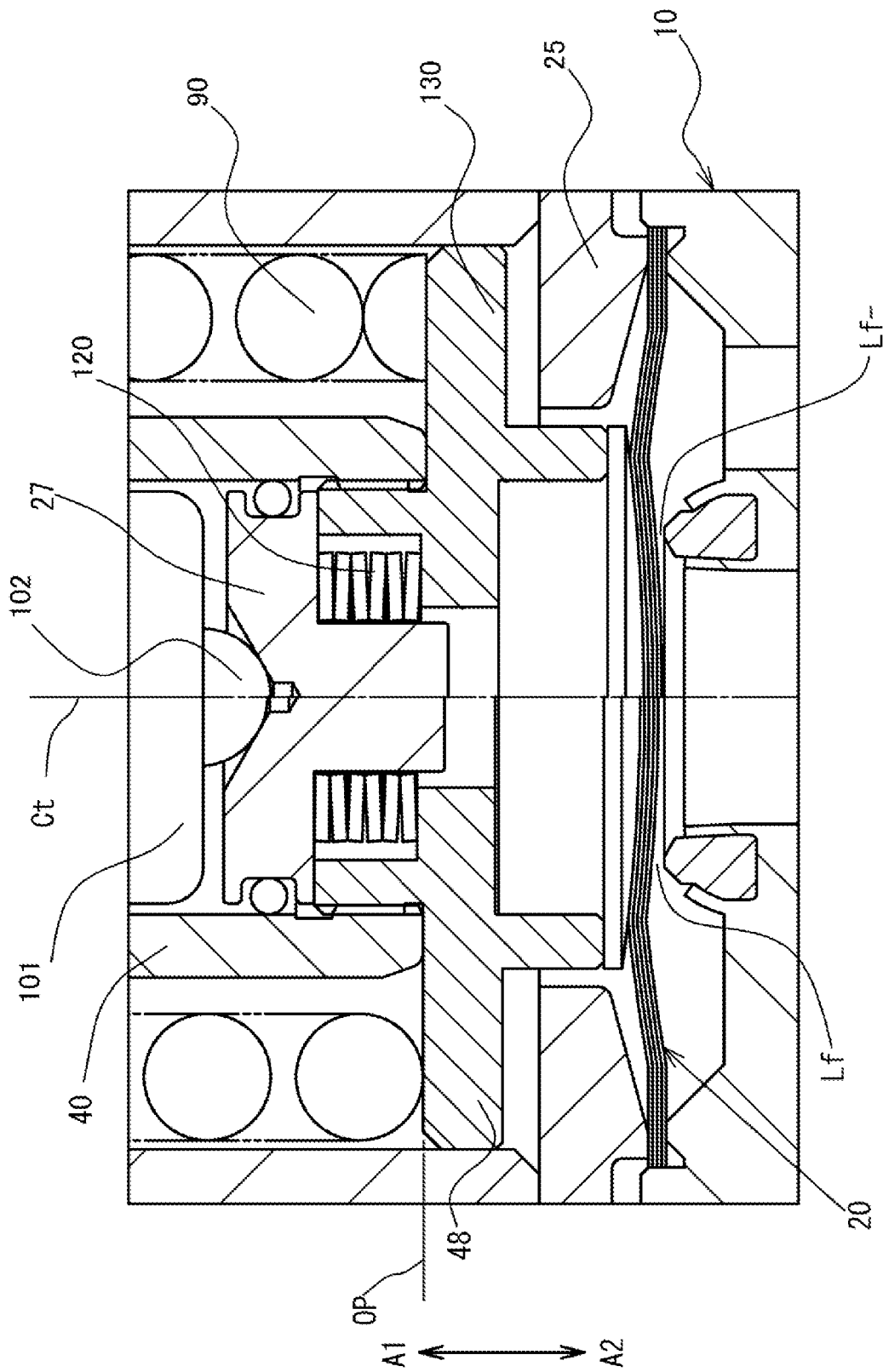
[fig.8A]

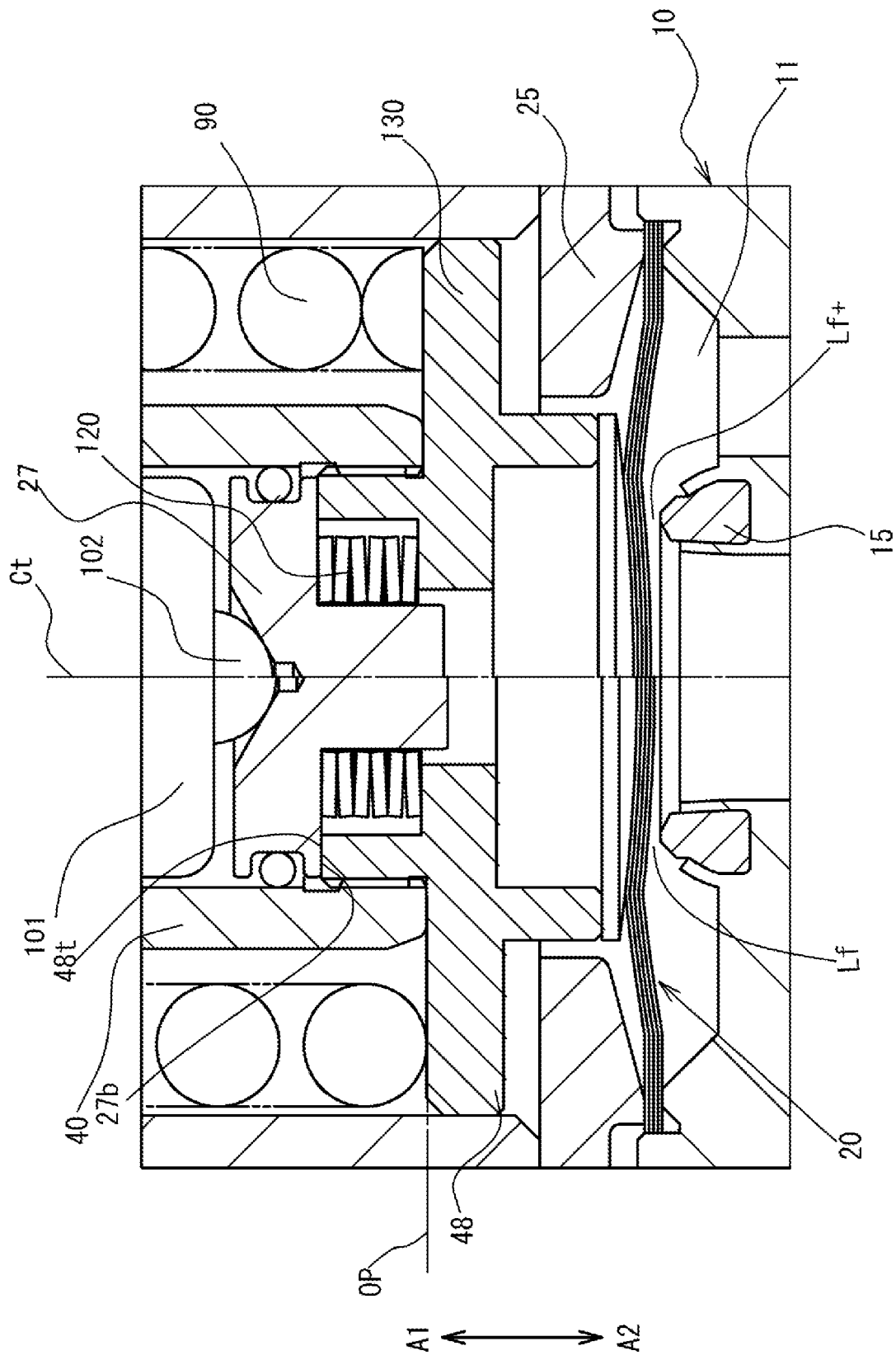

[fig.9]
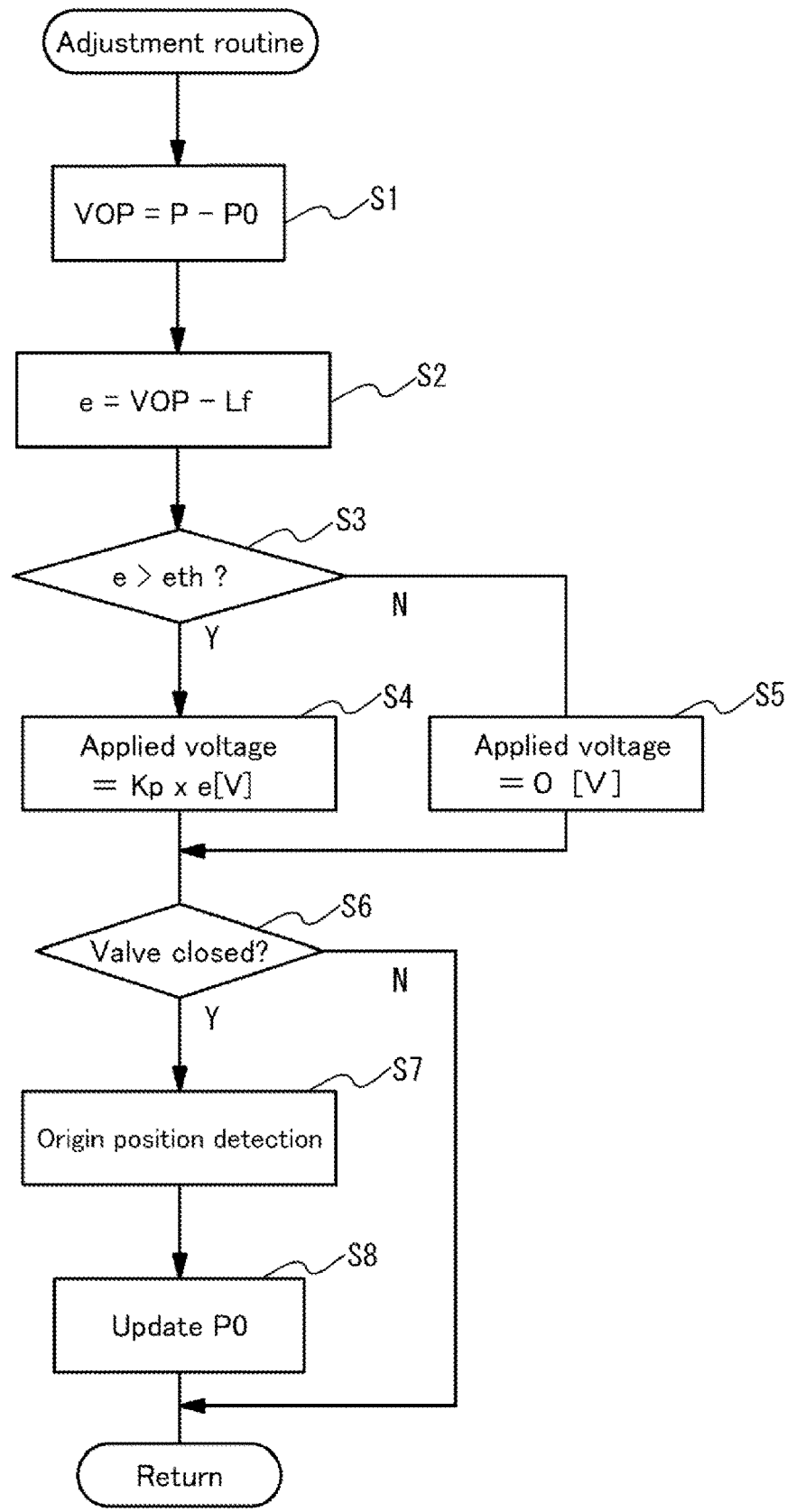

[fig.10]
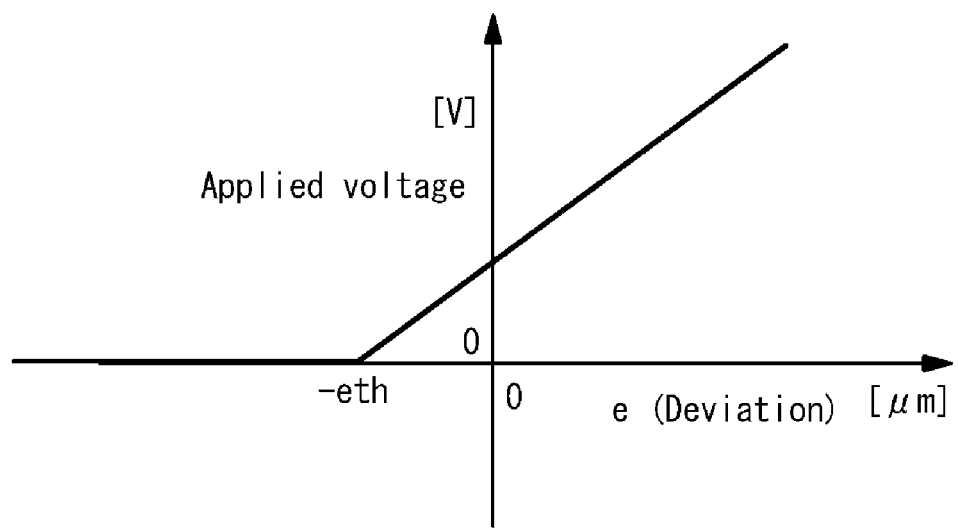

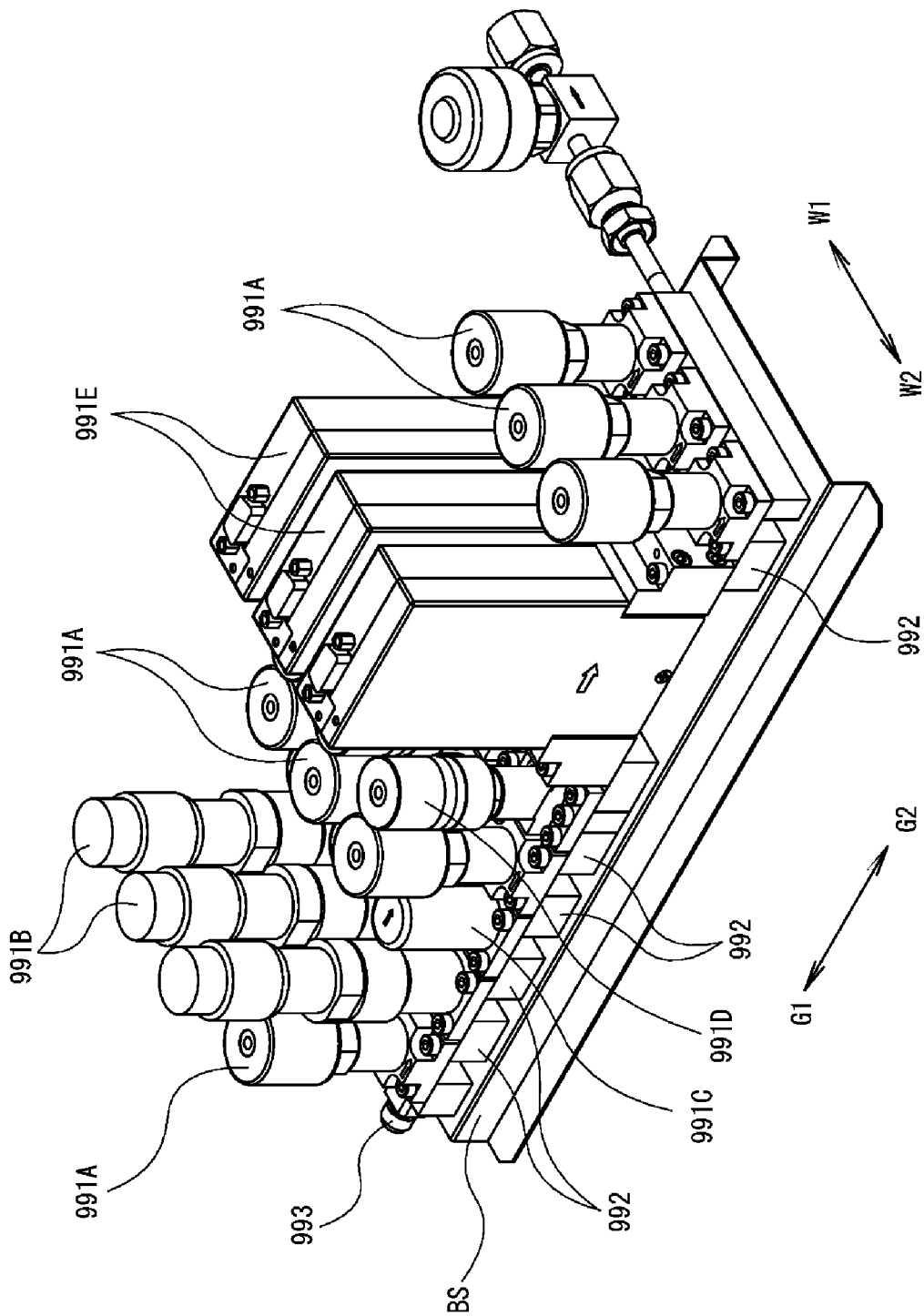

VALVE DEVICE, FLOW RATE CONTROL METHOD, FLUID CONTROL DEVICE, SEMICONDUCTOR MANUFACTURING METHOD, AND SEMICONDUCTOR MANUFACTURING APPARATUS USING THE VALVE DEVICE

TECHNICAL FIELD

The present invention relates to a valve device, a flow rate control method, a fluid control device, and semiconductor manufacturing method using the valve device.

BACKGROUND ART

In a semiconductor manufacturing process, a fluid control device in which various fluid control devices such as an open-close valve, a regulator, and a mass flow controller are integrated is used in order to supply an accurately metered process gas to a processing chamber.

Usually, the process gas outputted from the fluid control device is directly supplied to the processing chamber, but in a process of depositing a film on a substrate by an atomic layer deposition (ALD) method, in order to stably supply the process gas, the process gas supplied from the fluid control device is temporarily stored in a tank as a buffer, and a valve provided in the immediate vicinity of the processing chamber is frequently opened and closed to supply the process gas from the tank to the processing chamber in a vacuum atmosphere. As a valve provided in the immediate vicinity of the process chamber, see, for example, Patent Literature 1.

The ALD method is one of chemical vapor deposition methods, in which two or more types of process gases are alternately flowed on the substrate surface under film forming conditions such as temperature and time to react with atoms on the substrate surface to deposit a film layer by layer, and since every monoatomic layer can be controlled, a uniform film thickness can be formed and a film can be grown very densely as a film quality. In the semiconductor manufacturing process by the ALD method, it is necessary to precisely adjust the flow rate of the process gas.

PATENT LITERATURE

PTL 1: Japanese Laid-Open Patent Application No. 2007-64333
PTL 2: International Publication No. WO2018/088326

SUMMARY OF INVENTION

Technical Problem

In the air-operate diaphragm valve, the flow rate changes with time due to crush of resin valve seat over time, expansion or shrinkage of the resin valve seat by heat change, or the like.

Therefore, in order to more precisely control the flow rate of the process gas, it is necessary to adjust the flow rate according to the change of the flow rate with time.

The applicant has proposed, in Patent Literature 2, a valve device that is provided with an actuator for adjusting the position of an operating member that operates a diaphragm and can automatically and precisely adjust the flow rate in addition to the main actuator that operates by the pressure of a supplied drive fluid.

Conventionally, for the valve device disclosed in Patent Literature 2, there has been a request for more precise flow rate control by detecting the opening degree of the diaphragm as a valve element.

An object of the present invention is to provide a valve device which can precisely adjust the flow rate.

Another object of the present invention is to provide a flow rate control method, a fluid control device, a semiconductor manufacturing method, and a semiconductor manufacturing apparatus using such a valve device.

Solution to Problem

The valve device according to the present invention comprises: a valve body that defines a flow path through which a fluid flows and an opening that opens to the outside in the middle of the flow path;

a valve seat provided around the opening of the valve body;

a diaphragm as a valve element that covers the opening to separate the flow path from the outside and contacts to and separates form the valve seat to open and close the flow path;

an operating member for operating the diaphragm, that is provided movably between a closed position at which the diaphragm closes the flow path and an open position at which the diaphragm opens the flow path;

a main actuator that receives a pressure of a supplied drive fluid and moves the operating member to the open position or the closed position;

an adjusting actuator for adjusting a position of the operating member positioned at the open position by utilizing a passive element that expands and contracts in response to a given input signal;

a position detecting mechanism for detecting the position of the operating member with respect to the valve body; and an origin position determining unit that determines an origin position of the position detecting mechanism by utilizing the valve closed state in which the diaphragm contacts to the valve seat.

Preferably, the origin position determining unit determines and updates the origin position every time the valve is closed.

More preferably, the valve device further comprises a control unit that drives the adjusting actuator to control the position of the operating member from an origin position determined by the origin determining unit to a target position so that the valve opening degree reaches a target opening degree.

The flow rate control method of the present invention is a flow rate control method comprises using the valve device having the above configuration to adjust the flow rate of a fluid.

The fluid control device of the present invention is a fluid control device comprising a plurality of fluid device that is arranged, wherein the plurality of fluid devices includes the valve device having the above configuration.

The semiconductor manufacturing method of the present invention comprises using the valve device of the above configuration for controlling a flow rate of a process gas in a manufacturing process of a semiconductor device requiring a process step using the process gas in a sealed chamber.

The semiconductor manufacturing apparatus of the present invention comprises the valve device of the above configuration for controlling a flow rate of a process gas in a manufacturing process of a semiconductor device requiring a process step using the process gas in a sealed chamber.

Advantageous Effects of Invention

According to the present invention, since the origin position of the position detecting mechanism is determined by utilizing the contact of the diaphragm to the valve seat, the valve opening degree can be detected more accurately and the flow rate with high accuracy is realized.

BRIEF DESCRIPTION OF DRAWINGS

FIG. 1A is a longitudinal cross-sectional view of a valve device according to an embodiment of the present invention, and is a sectional view along line 1A-1A in FIG. 1B.

FIG. 1B is a top view of the valve device in FIG. 1A.

FIG. 1C is an enlarged cross-sectional view of an actuator portion of the valve device in FIG. 1A.

FIG. 1D is an enlarged cross-sectional view of an actuator portion along line 1D-1D in FIG. 1B.

FIG. 1E is an enlarged cross-sectional view in a circle A in FIG. 1A.

FIG. 2 is a schematic diagram which shows operation of a piezoelectric actuator.

FIG. 3 is a schematic diagram which shows an application of the valve device according to an embodiment of the present invention to a process gas control system of a semiconductor manufacturing apparatus.

FIG. 4 is a functional block diagram which shows a schematic configuration of a control system.

FIG. 5 is an enlarged cross-sectional view of a main part to explain the fully open status of the valve device in FIG. 1A.

FIG. 6 is an enlarged cross-sectional view of a main part to explain the fully closed status of the valve device in FIG. 1A.

FIG. 7 is a diagram for explaining the main cause of an occurrence of flow rate change with time.

FIG. 8A is an enlarged cross-sectional view of a main part for explaining a state when the flow rate of the valve device in FIG. 1A is adjusted (when the flow rate is decreased).

FIG. 8B is an enlarged cross-sectional view of a main part for explaining a state when the flow rate of the valve device in FIG. 1A is adjusted (when the flow rate is increased).

FIG. 9 is a flowchart showing an example of the processing of the control unit.

FIG. 10 is a graph showing an example of the relationship between the applied voltage to the piezoelectric actuator and the deviation.

FIG. 11 is an external perspective view showing an exemplary fluid control device.

DESCRIPTION OF EMBODIMENTS

FIG. 1A is a cross-sectional view showing the configuration of the valve device 1 according to an embodiment of the present invention, showing a state in which the valve is fully closed. FIG. 1B is a top view of the valve device 1, FIG. 1C is an enlarged longitudinal sectional view of an actuator portion of the valve device 1, FIG. 1D is an enlarged longitudinal sectional view of the actuator portion in a direction 90 degrees different from that of FIG. 1C, and FIG. 1E is an enlarged sectional view in a circle A in FIG. 1A. In the following explanations, A1 in FIG. 1A indicates the upward direction, and A2 indicates the downward direction.

The valve device 1 comprises a housing box 301 provided on a support plate 302, a valve main unit 2 installed in the housing box 301, and a pressure regulator 200 installed in a ceiling portion of the housing box 301.

In FIGS. 1A to 1E, 10 indicates a valve body, 15 indicates a valve seat, 20 indicates a diaphragm, 25 indicates a presser adapter, 27 indicates an actuator receiver, 30 indicates a bonnet, 40 indicates an operating member, 48 indicates a diaphragm presser, 50 indicates a casing, 60 indicates a main actuator, 70 indicates an adjusting body, 80 indicates a actuator presser, 85 indicates a position detecting mechanism, 86 indicates a magnetic sensor, 87 indicates a magnet, 90 indicates a coil spring, 100 indicates a piezoelectric actuator as an adjusting actuator, 120 indicates a disc spring, 130 indicates a partition wall member, 150 indicates a supply pipe, 160 indicates a limit switch, OR indicates an O-ring as a seal member, G indicates compressed air as a driving fluid. The driving fluid is not limited to compressed air, and other fluids may be used.

The valve body 10 is made of a metal such as stainless steel and defines flow paths 12, 13. The flow path 12 has one end that opens on one side surface of the valve body 10 as an opening 12a, and a pipe joint 501 is connected to the opening 12a by welding. The other end 12b of the flow path 12 is connected to a flow path 12c extending in the vertical directions A1 and A2 of the valve body 10. The upper end portion of the flow path 12c is opened at an upper surface side of the valve body 10, the upper end portion is opened at a bottom surface of a recess 11 formed on the upper surface side of the valve body 10, and the lower end portion is opened at the lower surface side of the valve body 10. At the opening of the lower end side of the flow path 12c, a pressure sensor 400 is provided, that closes the opening of the lower end side of the flow path 12c.

The valve seat 15 is provided around the opening of the upper end portion of the flow path 12c. The valve seat 15 is made of synthetic resin (PFA, PA, PI, PCTFE, etc.), it is fitted and fixed to a mounting groove provided in the opening periphery of the upper end side of the flow path 12c. In the present embodiment, the valve seat 15 is fixed in the mounting groove by caulking.

A flow path 13 has one end that opens at the bottom surface of the recess 11 of the valve body 10 and the other end that opens as an opening 13a on a side surface of the valve body 10 on the opposite side of the flow path 12, and a pipe joint 502 is connected to the opening 13a by welding.

The diaphragm 20 is disposed above the valve seat 15, defines a flow path communicating the flow path 12c and the flow path 13, and opens and closes the gateway between the flow paths 12 and 13 by moving the central portion thereof up and down to contact to and separate from the valve seat 15. In the present embodiment, the diaphragm 20 has a spherical shell shape in which an upward convex arc shape in natural state is formed by swelling upward a central portion of a metal thin plate of special stainless steel or the like and a nickel-cobalt alloy thin plate. Three such special stainless steel thin plates and one nickel-cobalt alloy thin plate are laminated to form a diaphragm 20.

The diaphragm 20 has an outer peripheral edge portion mounted on the protruding portion formed on the bottom of the recess 11 of the valve body 10, and by inserting the lower end portion of the bonnet 30 into the recess 11 and screwing the lower end portion with the screw portion of the valve body 10, the diaphragm is pressed toward the protruding portion of the valve body 10 through a presser adapter 25 made of stainless alloy and is clamped and fixed in an airtight state. The nickel-cobalt alloy thin film can be used in other configurations as the diaphragm which is arranged on the gas contact side.

The operating member 40 is a member for operating the diaphragm 20 so that the diaphragm 20 opens and closes the gateway between the flow path 12 and the flow path 13, and is formed in a substantially cylindrical shape opened at its upper end side. The operating member 40 is fitted to the inner peripheral surface of the bonnet 30 via an O-ring OR (see FIGS. 1C and 1D), and is movably supported in the vertical directions A1 and A2.

A diaphragm presser 48 made of a synthetic resin such as polyimide and abutting on the upper surface of the central portion of the diaphragm 20 is mounted on the lower end surface of the operating member 40.

A coil spring 90 is provided between the upper surface of the flange portion 48*a* formed on the outer peripheral portion of the diaphragm presser 48 and the ceiling surface of the bonnet 30, and the operating member 40 is constantly biased downward A2 by the coil spring 90. Therefore, when the main actuator 60 is not operated, the diaphragm 20 is pressed against the valve seat 15, and the gateway between flow path 12 and flow path 13 is closed.

Between the lower surface of the actuator receiver 27 and the upper surface of the diaphragm presser 48, a disc spring 120 is provided as an elastic member.

The casing 50 is composed of an upper casing member 51 and a lower casing member 52, and a screw on the inner circumference of the lower end portion of the lower casing member 52 is screwed into a screw on the outer periphery of the upper end portion of the bonnet 30. Further, a screw on the inner circumference of the lower end portion of the upper casing member 51 is screwed into a screw on the outer circumference of the upper end portion of the lower casing member 52.

An annular bulkhead 65 is fixed between the upper end portion of the lower casing member 52 and an opposing surface 51*f* of the upper casing member 51 facing the upper end portion of the lower casing member 52. Between the inner peripheral surface of the bulkhead 65 and the outer peripheral surface of the operating member 40 and between the outer peripheral surface of the bulkhead 65 and the inner peripheral surface of the upper casing member 51, sealing is provided by respective O-rings OR.

The main actuator 60 has annular first to third pistons 61, 62, 63. The first to third pistons 61, 62, and 63 are fitted to the outer peripheral surface of the operating member 40 and are movable in the vertical directions A1 and A2 together with the operating member 40. Between the inner peripheral surface of the first to third pistons 61, 62, 63 and the outer peripheral surface of the operating member 40, between the outer peripheral surface of the first to third pistons 61, 62, 63 and the upper casing member 51, between the outer peripheral surface of the first to third pistons 61, 62, 63 and the lower casing member 52, and between the outer peripheral surface of the first to third pistons 61, 62, 63 and the inner peripheral surface of the bonnet 30, sealing is provided by a plurality of O-rings OR.

As shown in FIGS. 1C and 1D, a cylindrical partition wall member 130 is fixed to the inner peripheral surface of the operating member 40 so as to have a gap GP1 between the inner peripheral surface of the operating member 40. The gap GP1 is sealed by a plurality of O-rings OR1~OR3 provided between the outer peripheral surface of the upper end side and the lower end side of the partition wall member 130 and the inner peripheral surface of the operating member 40, and forms a flow passage of the compressed air G as a driving fluid. The flow passage formed by the gap GP1 is concentrically arranged with the piezoelectric actuator 100. A gap GP2 is formed between the casing 101 of the piezoelectric actuator 100 and the partition wall member 130, which will be described later.

As shown in FIG. 1D, the pressure chambers C1 to C3 are formed under the lower surfaces of the first to third pistons 61, 62, and 63, respectively.

Flow passages 40*h*1, 40*h*2, and 40*h*3 are formed to penetrate radially through the operating member at positions communicating with the pressure chambers C1, C2, and C3. The flow passages 40*h*1, 40*h*2, 40*h*3 are each a plurality of flow passages formed at equal intervals in the circumferential direction of the operating member 40. The flow passages 40*h*1, 40*h*2, and 40*h*3 are each connected to the flow passage formed by the gap GP1.

The upper casing member 51 of the casing 50 is formed with a flow passage 51*h* which opens at the upper surface and extends in the vertical directions A1 and A2 and communicates with the pressure chamber C1. A supply pipe 150 is connected to the opening of the flow passage 51*h* via a pipe joint 152. Thus, the compressed air G supplied from the supply pipe 150 is supplied to the pressure chambers C1, C2, and C3 through the flow passages described above.

Space SP above the first piston 61 in the casing 50 is connected to the atmosphere through the through hole 70*a* of the adjusting body 70.

As shown in FIG. 1C, a limit switch 160 is installed on the casing 50, and the movable pin 161 penetrates the casing 50 and is in contact with the upper surface of the first piston 61. The limit switch 160 detects the amount of movement of the first piston 61 (operating member 40) in the vertical directions A1, A2 in response to the movement of the movable pin 161.

Position Detecting Mechanism

As shown in FIG. 1E, the position detecting mechanism 85 is provided on the bonnet 30 and the operating member 40 and includes a magnetic sensor 86 embedded along the radial direction of the bonnet 30 and a magnet 87 embedded in a portion of the circumferential direction of the operating member 40 so as to face the magnetic sensor 86.

In the magnetic sensor 86, a wiring 86*a* is led out to the outside of the bonnet 30, the wiring 86*a* is composed of a feeder line and a signal line, and the signal line is electrically connected to a control unit 300 to be described later. Examples of the magnetic sensor 86 include those utilizing a Hall element, those utilizing a coil, those utilizing an AMR element whose resistance value changes depending on the strength and orientation of the magnetic field, or the like, and position detection can be made non-contact by combining with a magnet.

The magnet 87 may be magnetized in the vertical directions A1 and A2, or may be magnetized in the radial direction. The magnet 87 may be formed in a ring shape.

In the present embodiment, the magnetic sensor 86 is provided on the bonnet 30 and the magnet 87 is provided on the operating member 40, but it is not limited thereto, and can be changed as appropriate. For example, it is also possible to provide a magnetic sensor 86 on the presser adapter 25 and provide a magnet 87 at a facing position on a flange portion 48*a* formed on the outer peripheral portion of the diaphragm presser 48. It is preferable to install the magnet 87 on the side movable with respect to the valve body 10 and install the magnetic sensor 86 on the valve body 10 or on the side that not movable with respect to the valve body 10.

Here, the operation of the piezoelectric actuator 100 will be described with reference to FIG. 2.

The piezoelectric actuator 100 incorporates a laminated piezoelectric element (not shown) in a cylindrical casing 101 shown in FIG. 2. The casing 101 is made of a metal such as stainless steel alloy, and the end surface of the hemispherical tip end portion 102 side and the end surface of the base end portion 103 side are closed. By applying a voltage as an input signal to the laminated piezoelectric element to extend it, the end surface of the casing 101 on the tip end portion 102 side is elastically deformed, and the hemispherical tip end portion 102 is displaced in the longitudinal direction.

Assuming that the largest stroke of the laminated piezoelectric element is $2d$, the total length of the piezoelectric actuator 100 becomes L0 by previously applying a predetermined voltage V0 at which the elongation of the piezoelectric actuator 100 becomes d. When a voltage higher than the predetermined voltage V0 is applied, the total length of the piezoelectric actuator 100 becomes L0+d at the maximum, and when a voltage (including no voltage) lower than the predetermined voltage V0 is applied, the total length of the piezoelectric actuator 100 becomes L0−d at the minimum. Therefore, it is possible to expand and contract the total length from the tip end portion 102 to base end portion 103 in the vertical directions A1 and A2. In the present embodiment, the tip end portion 102 of the piezoelectric actuator 100 is hemispherical, but the present invention is not limited thereto, and the tip end portion may be a flat surface.

As shown in FIGS. 1A and 1C, power is supplied to the piezoelectric actuator 100 by a wiring 105. The wiring 105 is led out to the outside through the through hole 70a of the adjusting body 70.

As shown in FIGS. 1C and 1D, the vertical position of the base end portion 103 of the piezoelectric actuator 100 is defined by the lower end surface of the adjusting body 70 via the actuator presser 80. In the adjusting body 70, a screw portion provided on the outer peripheral surface of the adjusting body 70 is screwed into a screw hole formed in the upper portion of the casing 50, and by adjusting by adjusting the positions of the adjusting body 70 in the of the vertical directions A1 and A2, it is possible to adjust the position of the piezoelectric actuator 100 in the vertical directions A1 and A2.

As shown in FIG. 1, the tip end portion 102 of the piezoelectric actuator 100 abuts against a conical receiving surface formed on the upper surface of the disk-shaped actuator receiver 27. The actuator receiver 27 is movable in the vertical directions A1 and A2.

The pressure regulator 200 has a primary side connected to a supply pipe 203 via a pipe joint 201, and a secondary side connected to a pipe joint 151 provided at the tip end portion of a supply pipe 150.

The pressure regulator 200 is a well-known poppet valve type pressure regulator, and although a detailed description thereof will be omitted, it is controlled so that the secondary pressure becomes a preset adjusted pressure by reducing the high-pressure compressed air G supplied through the supply pipe 203 to the desired pressure. When the pressure of the compressed air G supplied through the supply pipe 203 fluctuates due to pulsation or disturbance, this fluctuation is suppressed and output to the secondary side.

FIG. 3 shows an example in which the valve device 1 according to the embodiment is applied to a process gas control system of a semiconductor manufacturing apparatus.

The semiconductor manufacturing apparatus 1000 in FIG. 3 is, for example, an apparatus for executing a semiconductor manufacturing process by the ALD method, in which 800 denotes a supply source of compressed air G, 810 denotes a supply source of the process gas PG, 900A to 900C denote fluid control devices, VA to VC denote open-close valves, 1A to 1C denotes valve devices according to the present embodiment, and CHA-CHC denote process chambers.

In the semiconductor manufacturing process by the ALD method, it is necessary to precisely adjust the flow rate of the process gas, and it is also necessary to secure a certain amount of the flow rate of the process gas along with increase of the diameter of the substrate.

The fluid control devices 900A to 900C constitute an integrated gas system that integrates various fluid devices such as open-close valves, regulators, and mass flow controllers in order to supply precisely metered process gas PG to each of the processing chambers CHA to CHC.

The valve devices 1A to 1C precisely control the flow rate of the process gas PG from the fluid control devices 900A to 900C by opening and closing the diaphragm 20 as described above, and supply them to the processing chambers CHA to CHC, respectively.

The open-close valves VA to VC execute supply and shut-off of the compressed air G in response to a control command in order to open and close the valve devices 1A to 1C.

In the semiconductor manufacturing apparatus 1000 as described above, compressed air is supplied from a common supply source 800, but open-close valves VA to VC are driven independently.

From the common supply source 800, compressed air G with substantially constant pressure is constantly output, but when open-close valves VA to VC are opened and closed independently, the pressure of the compressed air G supplied to the valve devices 1A to 1C is fluctuated due to the effects of pressure loss when the valve is opened and closed, and is not constant.

When the pressure of the compressed air G supplied to the valve devices 1A to 1C fluctuates, there is a possibility that the flow rate adjusting amount by the piezoelectric actuator 100 described above will fluctuate. In order to solve this problem, the pressure regulator 200 described above is provided.

Next, the control unit of the valve device 1 according to the present embodiment will be described referring to FIG. 4.

As shown in FIG. 4, the control unit 300 is configured to receive the detection signal of the magnetic sensor 86 and controls the piezoelectric actuator 100. The control unit 300 includes, for example, hardware such as a processor, a memory, or the like (not shown) and required software, and a driver for driving the piezoelectric actuator 100. Specific examples of control of the piezoelectric actuator 100 by the control unit 300 will be described later.

Next, referring to FIGS. 5 and 6, the basic operation of the valve device 1 according to the present embodiment will be described.

FIG. 5 shows the valve device 1 in fully open status, and FIG. 6 shows the valve device 1 in fully closed status. In the state shown in FIG. 6, the compressed air G is not supplied. In this state, the disc spring 120 has already been compressed to some extent and elastically deformed, and the restoring force of the disc spring 120 causes the actuator receiver 27 to be constantly biased toward the upward direction A1. Thus, the piezoelectric actuator 100 is also constantly biased toward the upward direction A1, and the upper surface of the base end portion 103 is in a state of being pressed against the actuator presser 80. Thus, the piezoelectric actuator 100 receives the compressive force in the vertical direction A1, A2 and is disposed at a predetermined position relative to the valve body 10. Since the piezoelectric actuator 100 is not connected to any member, it is relatively movable in the vertical direction A1, A2 with respect to the operating member 40.

The number and orientation of the disc spring 120 can be appropriately changed depending on the condition. In addition to the disc spring 120, other elastic members such as a coil spring and a leaf spring can be used, but the use of a disc spring makes it easy to adjust spring stiffness, stroking, or the like.

As shown in FIG. 6, when the diaphragm 20 is in contact with the valve seat 15 and the valve is closed, a gap is formed between the regulating surface 27b on the lower surface side of the actuator receiver 27 and the contact surface 48t on the upper surface side of the diaphragm presser 48 mounted on the operating member 40. The positions of the regulating surface 27b in the vertical direction A1 and A2 becomes the open position OP in a state in which the opening degree is not adjusted. The distance between the regulating surface 27b and the contact surface 48t in the fully closed state corresponds to the lift amount Lf of the diaphragm 20 shown in FIG. 5. The lift amount Lf defines the opening degree of the valve, that is, the flow rate. The lift amount Lf can be changed by adjusting the position of the adjusting body 70 in the vertical directions A1 and A2. The diaphragm presser 48 (operating member 40) in the state shown in FIG. 5 is located at the closed position CP with reference to the contact surface 48t. When the contact surface 48t moves to a position in contact with the regulating surface 27b of the actuator receiver 27, that is, to the open position OP, the diaphragm 20 is separated from the valve seat 15 by the lift amount Lf.

When the compressed air G is supplied into the valve device 1 through the supply pipe 150, a thrust force that pushes the operating member 40 upward A1 is generated in the main actuator 60. The pressure of the compressed air G is set to a value sufficient to move the operating member 40 upward A1 against the biasing force of the downward A2 acting on the operating member 40 from the coil spring 90 and the disc spring 120. When such compressed air G is supplied, the operating member 40 moves in the upward direction A1 while further compressing the disc spring 120, the contact surface 48t of the diaphragm presser 48 abuts the regulating surface 27b of the actuator receiver 27, and the actuator receiver 27 receives a force from the operating member 40 in the upward direction A1. This force acts as a force for compressing the piezoelectric actuator 100 in the vertical directions A1 and A2 through tip end portion 102 of the piezoelectric actuator 100. Therefore, the force in the upward direction A1 acting on the operating member 40 is received by the tip end portion 102 of the piezoelectric actuator 100, and the movement in the A1 direction of the operating member 40 is regulated in the open position OP. In this state, the diaphragm 20 is separated from the valve seat 15 by the lift amount Lf described above.

Next, an example of the flow rate adjustment of the valve device 1 will be described with reference to FIGS. 7, 8A, 8B and the flowchart of FIG. 9.

First, the position detecting mechanism 85 described above detects the relative displacement between the valve body 10 and the magnetic sensor 86 in the states shown in FIGS. 5 and 6. As shown in FIG. 9, the valve opening degree VOP is calculated using the sampling data obtained by sampling the signal detected by the position detecting mechanism 85 at a predetermined sampling time (step S1).

The valve opening degree VOP is defined by the difference between the displacement P converted from the detection output of the position detecting mechanism 85 and the origin position P0, and basically, it can be determined by converting to a displacement value the difference between the output of the magnetic sensor 86 at a position where the diaphragm 20 is in contact with the valve seat 15 and the output of the magnetic sensor 86 in a state in which the diaphragm 20 is away from the valve seat 15.

The origin position P0 is determined based on the detection output of the magnetic sensor 86 in a state in which the diaphragm 20 is in contact with the valve seat 15, and the initial origin position P0 is in a state in which the diaphragm 20 is in contact with the valve seat 15 in a state shown in FIG. 7(a). However, even in a state in which the diaphragm 20 is in contact with the valve seat 15, since the valve seat 15 is made of resin, it is deformed as shown in FIG. 7(b) and FIG. 7(c) or it is affected by disturbance, the output of the magnetic sensor 86 is not constant. Therefore, as described later, it is necessary to determine the origin position P0 from the output of the sampled magnetic sensor 86. The initial origin position P0 can be determined at the time of product shipment. Further, a temperature sensor may be separately provided to perform temperature-compensations of the value of the displacement P and the value of origin position P0.

When the valve opening degree VOP is calculated, the deviation e between the valve opening degree VOP and the lift amount Lf is calculated (step S2). As described in FIG. 7, when the diaphragm 20 is deformed, a deviation occurs between the valve opening degree VOP and the lift amount Lf in the open state. In the case of FIG. 7(b), the deviation e is −α, and in the case of FIG. 7(c), the deviation e is β.

Next, it is determined whether the deviation e is smaller than the predetermined threshold value −eth (eth is a positive value) (step S3). Since the opening degree adjustment is not necessary when the valve device 1 is in the valve closed state, it is determined whether the opening degree adjustment is not necessary. That is, it is determined whether the valve opening VOP is less than the predetermined opening degree.

When the valve opening degree VOP is determined to be greater than the predetermined opening degree (step S3: Y), a voltage corresponding to the magnitude of the deviation e is applied to the piezoelectric actuator 100. That is, a feedback control is performed. In the present embodiment, the deviation e is compensated only by the gain element Kp, but PID compensation may be performed.

When it is determined that the valve opening degree VOP is less than the predetermined opening degree (step S3: N), 0V is applied to the piezoelectric actuator 100.

As shown in FIG. 10, a voltage is applied to the piezoelectric actuator 100 only when the deviation e is −eth or more (step S4), otherwise 0V is applied (step S5). Thus, when the opening degree adjustment of the valve is not required, the piezoelectric actuator 100 does not operate (does not extend), so that the life of the piezoelectric actuator 100 can be extended accordingly.

In the valve closed state, the value of displacement P is in the vicinity of the value of the origin position P0, the value of the valve opening degree VOP that is the calculation result of step S1 becomes extremely small. Next, when the lift amount Lf is subtracted from the valve opening degree VOP in the valve closed state in step S2, the deviation e is always a negative value. When the deviation e is negative, it means that the valve opening degree VOP is less than the lift amount Lf, and if step S4 is performed in this state, the voltage applied to the piezoelectric actuator 100 is always a negative value. As a result, the voltage applied to the piezoelectric actuator 100 becomes a negative value, substantially 0V. Therefore, since it is not necessary to determine that the valve opening degree VOP has fallen below the predetermined opening degree, the above-described step S3 and step 5 can be omitted, and if omitted, the number of steps is reduced and increase of the processing speed can be expected.

Determination of Origin Position

Control unit 300 determines whether the valve is in the closed state based on the output of the magnetic sensor 86 (step S6). When it is determined that the valve is closed, the origin position is detected (step S7). The control unit 300 also serves as an origin position determining unit (step S6: Y).

The origin position is detected by, for example, any of the following methods.

(1) Sampling output values of the magnetic sensor, adapting a sensor output value at a time a predetermined time TO before the time when the valve becomes form a valve closed state to a valve open state (when the sensor output value exceeds the threshold value), and updating the origin position based on the adapted sensor output value (step S8).

(2) Sampling the output values of the magnetic sensor, calculating the moving average of the sensor output values every t hours until the valve state changes from the valve closed state to the valve open state (until the sensor output value exceeds the threshold value), and updating the home position based on the calculated moving average.

(3) Sampling the output values of the magnetic sensor, adapting the lowest output value among the sensor output values until the valve state changes from the valve closed state to the time when the valve (until the sensor output value exceeds the threshold value), and updating the origin position based on the lowest output value.

Here, the left side of the center line Ct in FIGS. 8A and 8B shows a state shown in FIG. 5, the right side of the center line Ct shows a state after adjusting the position of the operating member 40 in the vertical directions A1, A2.

When adjusting the flow rate of the fluid in the reducing direction, as shown in FIG. 8A, the piezoelectric actuator 100 is extended to move the operating member 40 downward A2. Thus, the lift amount Lf− after adjustment that is the distance between the diaphragm 20 and the valve seat 15 is smaller than the lift amount Lf before adjustment. The extension amount of the piezoelectric actuator 100 may be the deformation amount of the valve seat 15 detected by the position detecting mechanism 85.

When adjusting the flow rate of the fluid in the increasing direction, as shown in FIG. 8B, the piezoelectric actuator 100 is shortened to move the operating member 40 upward A1. Thus, the lift amount Lf+ after adjustment that is the distance between the diaphragm 20 and the valve seat 15 is larger than the lift amount Lf before adjustment. The amount of reduction of the piezoelectric actuator 100 may be the deformation amount of the valve seat 15 detected by the position detecting mechanism 85.

In the present embodiment, the maximum value of the lift amount Lf of the diaphragm 20 is about 100 to 200 μm, the adjustment amount by the piezoelectric actuator 100 is about ±20 μm.

That is, in the stroke of the piezoelectric actuator 100, it is impossible to cover the lift amount of the diaphragm 20, but by using the main actuator 60 operated by compressed air G and the piezoelectric actuator 100 in combination, while ensuring the supply flow rate of the valve device 1 with the main actuator 60 having a relatively long stroke, the flow rate can be precisely adjusted with the piezoelectric actuator 100 which has a relatively short stroke, and since it becomes unnecessary to manually adjust the flow rate by the adjusting body 70 or the like, the flow rate adjusting man-hours are significantly reduced.

According to the present embodiment, since it is possible to precisely adjust flow rate only by changing the voltage applied to the piezoelectric actuator 100, it is possible to immediately execute the flow rate adjustment and also to control the flow rate in real time.

In the above embodiment, the piezoelectric actuator 100 is used as an actuator for adjustment utilizing a passive element that expands and contracts in response to a given input signal, but the present invention is not limited thereto. For example, an electrically driven material made of a compound that deforms in response to a change in an electric field can be used as an actuator. The shape and size of the electrically driven material can be changed by the current or voltage, and the open position of the restricted operating member 40 can be changed. Such an electrically driven material may be a piezoelectric material or an electrically driven material other than a piezoelectric material. When the material is an electrically driven material other than a piezoelectric material, the material may be electrically driven type polymeric material.

Electrically driven type polymeric material is also referred to as electroactive polymer material (Electro Active Polymer: EAP), and includes, for example, an electric EAP driven by an external electric field or a Coulombic force, a nonionic EAP in which a solvent swelling a polymer is flown by an electric field to deform the polymer, an ionic EAP driven by movement of ions and molecules by an electric field, and any one or a combination thereof can be used.

In the above embodiment, a so-called normally closed type valve is exemplified, but the present invention is not limited to this, and is also applicable to a normally open type valve.

In the above application example, the valve device 1 is used in a semiconductor manufacturing process by the ALD method, but the present invention is not limited to this, and the present invention can be applied to any object requiring precise flow rate control, such as an atomic layer etching (ALE) method.

In the above embodiment, as the main actuator, a piston incorporated in the cylinder chamber operated by gas pressure is used, but the present invention is not limited to this, and any optimum actuator to the control object is selectable.

In the above embodiment, a position detection mechanism including a magnetic sensor and a magnet has been exemplified, but the present invention is not limited thereto, and a non-contact type position sensor such as an optical position detecting sensor can be employed.

Referring to FIG. 11, an example of a fluid control device to which the valve device of the present invention is applied will be described.

In the fluid control device shown in FIG. 11, a base plate BS made of metal is provided, which is arranged along the width directions W1 and W2 and extends in the longitudinal directions G1 and G2. Note that W1 represents the front side, W2 represents the back side, G1 represents the upstream side, and G2 represents the downstream side. Various fluid devices 991A to 991E are installed on the base plate BS via a plurality of flow path blocks 992, and a flow path (not shown) through which a fluid flows from the upstream side G1 toward the downstream side G2 is formed by the plurality of flow path blocks 992.

Here, a "fluid device" is a device used in a fluid control device for controlling a flow of a fluid, and the fluid device comprises a body defining a fluid flow path, and has at least two flow path ports opening at a surface of the body. Specific examples include, but are not limited to, an open-close valve (two-way valve) 991A, a regulator 991B, a pressure gauge 991C, an open-close valve (three-way valve) 991D, a mass flow controller 991E, or the like. The inlet tube 993 is connected to a flow path port on the upstream side of the flow path (not shown) described above.

The present invention can be applied to various valve devices such as the above-mentioned open-close valve 991A and 991D and the regulator 991B.

REFERENCE SIGNS LIST 1,1A,1B,1C: Valve device
2: Valve main unit
10: Valve body
11: Recess
12: Flow path
12a: Opening
12b: Other end
12c,13: Flow path
15: Valve seat
20: Diaphragm
25: Presser adapter
27: Actuator receiver
27b: Regulating surface
30: Bonnet
40: Operating member
40h1 to 40h3: Flow passage
48: Diaphragm presser
48a: Flange portion
48t: Contact surface
50: Casing
51: Upper casing member
51f: Opposing surface
51h: Flow passage
52: Lower casing member
60: Main actuator
61: First piston
62: Second piston
63: Third piston
65: Bulkhead
70: Adjusting body
70a: Through hole
80: Actuator presser
85: Position detecting mechanism
86: Magnetic sensor
86a: Wiring
87: Magnet
90: Coil spring
100: Piezoelectric actuator (adjusting actuator)
101: Casing
102: Tip end portion
103: Base end portion
105: Wiring
120: Disc spring
130: Bulkhead member
150: Supply pipe
151,152: Pipe joint
160: Limit switch
161: Movable pin
200: Pressure regulator
201: Pipe joint
203: Supply pipe
300: Control unit
301: Storage box
302: Support plate
400: Pressure sensor
501,502: Pipe joint
800,810: Supply source
900A-900C: Fluid control device
1000: Semiconductor manufacturing apparatus
A: Circle
A1: Upward direction
A2: Downward direction
C1-C3: Pressure chamber
CHA, CHB, CHC: Processing chamber
CP: Closed position
Ct: Central line
G: Compressed air (driving fluid)
GP1, GP2: Gap
Lf: Lift amount
OP: Open position
OR-OR3: O-ring
PG: Process gas
P: Displacement
P0: Position of the origin
SP: Space
V0: Predetermined voltage
A-VC: Open-close valve
VOP: Open position
991A-991E: Fluid device
992: Flow path block
993: Inlet tube

The invention claimed is:

1. A valve device comprising:
   a valve body that defines a flow path through which a fluid flows and an opening that opens to the outside in a middle of the flow path;
   a valve seat provided around the opening of the valve body;
   a diaphragm as a valve element that covers the opening to separate the flow path from the outside, and contacts to and separates from the valve seat to open and close the flow path;
   an operating member for operating the diaphragm that is provided movably between a closed position at which the diaphragm closes the flow path and an open position at which the diaphragm opens the flow path;
   a main actuator that receives a pressure of a supplied drive fluid and moves the operating member to the open position or the closed position;
   an adjusting actuator for adjusting the position of the operating member positioned at the open position by utilizing a passive element that expands and contracts in response to a given input signal;
   a position detecting mechanism for detecting the position of the operating member with respect to the valve body; and
   an origin position determining unit that determines an origin position of the position detecting mechanism by utilizing the valve closed state in which the diaphragm contacts to the valve seat.

2. The valve device according to claim 1, wherein the origin position determining unit determines and updates the origin position every time the valve is closed.

3. The valve device according to claim 1, wherein the origin position determining unit samples a detection signal of the position detecting mechanism, and determines an origin position based on the sampling data at a time of shifting from the valve closed state to the valve open state.

4. The valve device according to claim 1, further comprising a control unit that drives the adjusting actuator to control the position of the operating member from an origin position determined by the origin determining unit to a target position so that the valve opening degree reaches a target opening degree.

5. The valve device according to claim 1, wherein the adjusting actuator comprises: a casing having a base end portion and a tip end portion; and a piezoelectric element housed in the casing and laminated between the base end portion and the tip end portion, wherein expansion and contraction of the piezoelectric element is utilized to expand and contract the entire length of the casing between the base end portion and the tip end portion.

6. A flow rate control method comprising using the valve device as defined in claim 1 for controlling the flow rate of a fluid.

7. A fluid control device comprising a plurality of fluid devices that are arranged,
   wherein the plurality of fluid devices includes the valve device as defined in claim 1.

\* \* \* \* \*